(12) United States Patent
Blomdahl (10) Patent No.: US 11,408,499 B2
(45) Date of Patent: Aug. 9, 2022

(54) DEVICE FOR TRANSFERRING ROTATIONAL POWER, A MACHINE INCLUDING SUCH A DEVICE AND USE OF SUCH A DEVICE

(71) Applicant: OXE Marine AB, Ängelholm (SE)

(72) Inventor: Andreas Blomdahl, Ängelholm (SE)

(73) Assignee: OXE Marine AB, Ängelholm (SE)

( * ) Notice: Subject to any disclaimer, the term of this patent is extended or adjusted under 35 U.S.C. 154(b) by 975 days.

(21) Appl. No.: 16/093,855

(22) PCT Filed: Mar. 21, 2017

(86) PCT No.: PCT/EP2017/056633
§ 371 (c)(1),
(2) Date: Oct. 15, 2018

(87) PCT Pub. No.: WO2017/174346
PCT Pub. Date: Oct. 12, 2017

(65) Prior Publication Data
US 2019/0136961 A1    May 9, 2019

(30) Foreign Application Priority Data
Apr. 6, 2016 (EP) .................................. 16164042

(51) Int. Cl.
*F16H 57/04* (2010.01)
*F16H 7/02* (2006.01)
*F16H 57/02* (2012.01)

(52) U.S. Cl.
CPC ........... *F16H 57/0401* (2013.01); *F16H 7/02* (2013.01); *F16H 57/0453* (2013.01);
(Continued)

(58) Field of Classification Search
CPC ............. F16H 57/0401; F16H 57/0453; F16H 57/0454; F16H 57/0471; F16H 57/035;
(Continued)

(56) References Cited

U.S. PATENT DOCUMENTS

| 3,111,864 A | 11/1963 | Joseph |
| 8,439,019 B1 * | 5/2013 | Carlson ................... F02B 33/44 |
| | | 123/559.3 |
| 2012/0042741 A1 | 2/2012 | Vincent et al. |

FOREIGN PATENT DOCUMENTS

| CN | 2563366 Y * | 7/2003 |
| CN | 2563366 Y | 7/2003 |

(Continued)

OTHER PUBLICATIONS

EP 16164042.0; EP Search Report of the European Patent Office dated Nov. 10, 2016.
(Continued)

*Primary Examiner* — Daniel D Yabut
(74) *Attorney, Agent, or Firm* — Renner, Otto, Boisselle & Sklar, LLP (57) ABSTRACT

A device (13) for transferring rotational power from a first shaft (14) to a second shaft (15), comprising an endless toothed belt (16) and a housing (17), wherein the belt (16) is arranged inside said housing (17) and is connectable to the first and second shafts (14, 15) for transferring rotational power from the first shaft (14) to the second shaft (15). The housing (17) comprises a first cavity (18) and a second cavity (19), wherein the second cavity (19) is separated from the first cavity (18) by means of a wall (20). The belt (16) is arranged in the first cavity (18) and the first cavity (18) is provided with a first liquid for contacting the belt (16). The second cavity (19) is provided with a second liquid, the second liquid being a cooling liquid. The housing (17) comprises an inlet (23) to the second cavity (19) and an
(Continued)

outlet (24) from the second cavity (19) for the second liquid, and the second cavity (19) is connected to a source of the second liquid through the inlet (23), so that the second liquid can be circulated through the second cavity (19). Disclosed is also a machine including such a device and uses of such a device for industrial machines.

14 Claims, 9 Drawing Sheets

(52) U.S. Cl.
CPC .................. *F16H 57/0471* (2013.01); *F16H 2057/02034* (2013.01); *F16H 2057/02069* (2013.01)

(58) Field of Classification Search
CPC ....... F16H 57/0489; F16H 2057/02034; F16H 7/02
See application file for complete search history.

(56) References Cited

FOREIGN PATENT DOCUMENTS

| | | | |
|---|---|---|---|
| CN | 102678897 A | 9/2012 | |
| CN | 104279306 A | 1/2015 | |
| DE | 1236276 B | 3/1967 | |
| DE | 197 31 705 | 8/1998 | |
| DE | 102011088649 A1 * | 6/2013 | ............ B60K 6/485 |
| GB | 104557 A | 3/1917 | |
| JP | S61233252 A | 10/1986 | |
| JP | 2010236626 A | 10/2010 | |

OTHER PUBLICATIONS

PCT/EP2017/056633; PCT International Search Report and Written Opinion of the International Searching Authority dated Oct. 12, 2017.
Chinese Office Action for corresponding Chinese Patent Application No. 201780034717.X dated Feb. 2, 2021.

\* cited by examiner

DEVICE FOR TRANSFERRING ROTATIONAL POWER, A MACHINE INCLUDING SUCH A DEVICE AND USE OF SUCH A DEVICE

This application is a national phase of International Application No. PCT/EP2017/056633 filed Mar. 21, 2017 and published in the English language, which claims priority to EP Patent Application No. 16164042.0 filed Apr. 6, 2016, all of which are hereby incorporated herein by reference in their entireties.

FIELD OF THE INVENTION

The present invention relates to a device for transferring rotational power. More specifically the present invention relates to device for transferring rotational power, also called torque herein, from a first shaft to a second shaft, comprising an endless toothed belt and a housing, wherein the belt is arranged inside said housing and is connectable to the first and second shafts for transferring rotational power from the first shaft to the second shaft. Such devices for transferring power are used for transferring rotational power from a motor to a moving part of a machine. Machines of this type are commonly used within industry, such as for example food industry, pharmaceutical industry and other types of industry, for different purposes, such as mixing, conveying, screening, milling, etc. Such machines are generally used inside industry facilities for production or handling of goods within said industry facilities. The machines are often stationary or are provided with wheels or similar for transportation. The present invention also relates to such a machine and also to use of a device for transferring rotational power.

PRIOR ART

A plurality of devices for transferring rotational power comprising a belt, sometimes called belt drives, and industrial machines comprising such devices are disclosed in the prior art. One type of such prior art machines comprises a motor having a first shaft in the form of a rotating output power shaft connected to a second shaft through a belt and pulleys. A first pulley is connected to the first shaft and a second pulley is connected to the second shaft, wherein the belt engages the pulleys for transferring the rotational power from the motor to the second shaft. The second shaft can carry a tool or can be arranged for rotating a conveyor or similar within industry facilities for the production or handling of goods.

One problem with such prior art devices for transferring rotational power is that they often are complicated and requires numerous moving parts for maintaining their function.

Another problem with such prior art devices is that they are not reliable and durable and hence can malfunction or wear out fast, which increases cost for maintenance.

Another problem with such prior art devices is that the goods or machinery for handling the goods easily is contaminated with dust.

Another problem with such prior art devices is that they are noisy.

BRIEF DESCRIPTION OF THE INVENTION

One object of the present invention is to overcome the above-mentioned problems and provide a reliable and durable transfer of rotational power, i.e. torque, by means of an endless belt. The device according to the present invention provides an efficient and strong transfer of rotational power. Simultaneously the device according to the invention operates with reduced noise levels compared to many prior art devices and also prevents goods, machinery and facilities to be contaminated with dust from the belt.

Hence, the present invention relates to a device for transferring rotational power from a first shaft to a second shaft, comprising an endless toothed belt and a housing, wherein the belt is arranged inside said housing and is connectable to the first and second shafts for transferring rotational power from the first shaft to the second shaft, wherein the housing comprises a first cavity and a second cavity separated from the first cavity by means of a wall, and wherein the belt is arranged in the first cavity, characterised in that the first cavity is provided with a first liquid, such as oil, for contacting the belt, that the second cavity is provided with a second liquid, wherein the second liquid is a cooling liquid, and that the housing comprises an inlet to the second cavity and an outlet from the second cavity for the second liquid, and wherein the second cavity is connected to a source of the second liquid through the inlet, so that the second liquid can be circulated through the second cavity. The first liquid can be oil and the second liquid can be water. According to the invention efficient cooling is provided for the belt and moving parts, which results in a highly durable and efficient structure that can transfer high rotational power. Further, the belt and optionally also other moving parts, such as pulleys and bearings, are in the separate first cavity, which is provided with the first liquid that reduces noise and provides a smooth and safe operation therein. It is also believed that the device described herein can handle greater torsional vibrations due to the first cavity being provided with the first liquid. Also, the first liquid in combination with the belt being arranged in the first cavity inside the housing prevents formation of dust from the belt due to operational wear and also prevents any particles formed from such wear to contaminate the surroundings. The combination of the first cavity with the first liquid and the second cavity with the cooling liquid of the housing results in an efficient and reliable transfer of rotational power with low noise levels and no dust from the belt contaminating the surroundings. The second cavity is connected to the source of cooling liquid through the inlet and the outlet, so that the cooling liquid can be circulated through the second cavity to provide efficient cooling of movable parts of the device. Hence, the device has cavities for both oil and cooling water or other types of cooling liquid. The second liquid can be any suitable cooling liquid even though sometimes referred to in the following disclosure as cooling water, which is understood by a skilled person. The first cavity where the belt is located is separated from the second cavity for cooling liquid. By adding a flow of cooling liquid to an inlet, e.g. at the top of the housing, the heat generated by bearings, seals and the belt itself is cooled and kept at a favorable operating temperature.

The wall between the first and second cavities can be arranged with a first bearing for receiving the first shaft and a second bearing for receiving the second shaft, said bearings being arranged with liquid proof sealing for sealing the first cavity. Hence, the shafts and bearings are efficiently cooled, while providing the possibility of easy access to the first cavity and the belt.

The wall separating the second cavity and the first cavity can be arranged along only one side of the first cavity, wherein the second cavity can be arranged substantially in parallel to the first cavity. For example, the wall extends in a single flat plane. The housing can comprise a hollow structure and a lid, wherein the second cavity is arranged inside the hollow structure, and wherein the first cavity is formed by the lid being engaged to the hollow structure. Hence, the shafts can extend through the hollow structure and into the first cavity.

The device can comprise first and second pulleys engaging the belt. A distance between a centre of the first pulley and a centre of the second pulley can be fixed when the device is assembled. Hence, a simplified structure is provided with less moving and adjustable parts. The pulleys can be arranged on conical bearings. Belt tension can be achieved when assembling the device and the belt and pulleys are mounted in the housing. When the angled bearing surfaces of the conical bearings are pushed into position the axles will align to the correct center-center distance, and thus achieving the desired belt tension. No special tools are then needed to assemble or disassemble the device.

Further, the housing can be provided with one or more belt guides in the first cavity to prevent the belt from slipping on the pulleys. The belt guides can be fixed belt guide surfaces on the internal periphery of the housing in the first cavity for reliable operation of the belt without risking tooth climb or tooth jump. Further a lower belt tension can be used due to the belt guides.

Flanges can be arranged inside the first cavity between first and second legs of the belt. The flanges can be cooling flanges, e.g. extending from the wall and into the first cavity. Hence, efficient cooling is provided. Also the flanges between the first and second legs of the belt provide reduced turbulence of the first liquid inside the first cavity and more efficient operation of the belt therein. The first liquid acts as a heat distributer for the heat from parts, such as belt, pulleys, seals and bearings, to the belt housing and is also acting as lubricant for bearings, seals and belt. The second cavity for cooling liquid can have fins to increase the surface of the belt housing that is exposed for the cooling liquid, which increase the heat transfer. The first cavity has the flanges that increases the surface of the belt housing that is exposed to the first liquid, resulting in an increase of heat transferred from the first liquid to the belt housing. The flanges in the first cavity also act as separator of the first liquid to lower the turbulence energy in the oil, resulting in lowering power losses and heat generated by turbulence.

In prior art devices noise is mainly generated when the belt meets the pulley and the air between the teeth and the grooves is pressed out. According to one aspect of this disclosure this noise is dampened by the first liquid and the belt housing prevents the sound for reaching the surrounding environment.

As mentioned, the device can comprise bearings, such as bearings mounted on the pulleys. For example, a first bearing or a first bearing set is mounted on the first pulley, and a second bearing or a second bearing set is mounted on the second pulley. For example, two bearings are mounted on each of the pulleys. The bearings can be provided with a liquid proof sealing for sealing the first cavity. By sealing the first cavity from the surrounding environment the parts inside the first cavity, such as the belt, pulleys and the bearings, are protected from dust, particles and similar. Hence, non-stainless parts, such as bearings, can be used, which can handle higher stress than stainless parts. Further, any dust and particles are prevented from leaving the first cavity, wherein contamination of the surroundings, such as goods and/or equipment, is prevented. The first cavity can be sealed by a minimum of seals, such as only two radial seals, which reduces friction.

The housing can comprise a hollow structure and a lid, wherein the second cavity can be arranged inside the hollow structure. The first shaft can extend through a first aperture formed in the hollow structure, and the second shaft can extend through a second aperture formed in the hollow structure. Hence, the second cavity with the second liquid can be formed around the first shaft and second shaft or corresponding bearings for providing efficient cooling of said parts.

The first pulley and the second pulley can be arranged inside the housing, wherein the belt is connected to the first and second pulleys. The size of the first pulley can be different from the size of the second pulley for providing the desired gear ratio. The device can be arranged with a rotational symmetry, so that the device with the pulleys and the belt arranged inside the housing can be detached, rotated 180 degrees and then connected to the first shaft and second shaft again to alter the positions of the first and second pulleys. Hence, the gear ratio can easily be changed by turning the device. Hence, the structure of the device allows a user to change the gear ratio to fit various demands. The two belt pulleys and the first and second shafts can be formed with splines. The splines can be similar resulting in that the device can be pulled off the splined shafts and then turned 180° and pushed back on the shafts. Since the pulleys can have different number of teeth the gear ratio will be changed when the device is turned around. A reason for doing this is for switching between high torque and high speed.

A distance between a centre of the first pulley and a centre of the second pulley can be fixed. According to one embodiment the device is arranged without a tensioner pulley (also called idler pulley), and with a fixed center to center distance of the pulleys. For example, the device comprises only two pulleys. Instead of a tensioner pulley or an adjustable center to center distance there are one or more fixed belt guiding surfaces in the belt housing. These are acting as a guide for the belt on the slack side to keep the belt engaged with the pulleys. With the belt guide the backside of the belt slides against the surface thereof and keeps the belt in place on the pulleys when required. Normally the belt and the belt guide can be arranged so that the belt is not touching the guide surface, and so that the belt is only touching the belt guide when the belt is so extended that it would risk that the belt starts to climb on the pulleys. Since the device has an amount of the first liquid, such as oil, in the first cavity, in which first cavity the belt is arranged, there will be an oil film between the belt and the belt guide surface resulting in a negligible friction between these. Because of the guide a lower belt tension can be used compared to other belt transmissions, this resulting in easier assembly of the unit.

The device can be connected to a supporting structure by means of a flexible coupling, such as rubber bushings. This lowers the stress in shafts and pulleys which can be the caused by small misalignment due to tolerance errors in manufacturing or assembly of the parts. Since the device can be self-contained with bearings mounted into the belt housing, there will be no resulting radial forces from the belt acting on the incoming shafts or the coupling, only momentum will be transferred. Therefore, there can be a flexible coupling mounted between the supporting structure and the device. The flexible coupling cannot handle radial forces but can withstand small radial movement and high rotational vibrations from the motor without transferring these to the second shaft.

The first shaft can be connected to or be part of an electric motor. Alternatively, the first shaft is connected to or is the crankshaft of an internal combustion engine or any other type of engine. The second shaft can be connected to or be part of a stationary machine, a movable machine having wheels or a machine for producing or handling of goods.

Disclosed is also a machine comprising a motor, a moving part and a device for transferring rotational power according to the invention for transferring the rotational power from the electric motor to the moving part. The motor can be an electric motor, such as a conventional electric motor, having a rotating shaft for output power. The moving part can be any type of tool, power transmission, driving shaft or similar. The machine can be stationary or provided with wheels.

Disclosed is also the use of a device according to the invention for driving a machine, such as a stationary machine or a machine provided with wheels, e.g. inside industry facilities, such as inside a building. The disclosed device for transferring rotational power can be used within various fields of industries, such as for postage equipment, sewing machines, food processing, oil industry machinery, vacuum conveyors, assembly conveyors, packaging conveyors, automotive industry, medical devices, manufacturing machinery, printers, paper industry machinery and clean room equipment.

Further characteristics and advantages of the present invention will become apparent from the description of the embodiments below, the appended drawings and the dependent claims.

SHORT DESCRIPTION OF THE DRAWINGS

The invention will now be described in more detail with the aid of exemplary embodiments and with reference to the accompanying drawings, in which.

THE INVENTION

Figure 1:
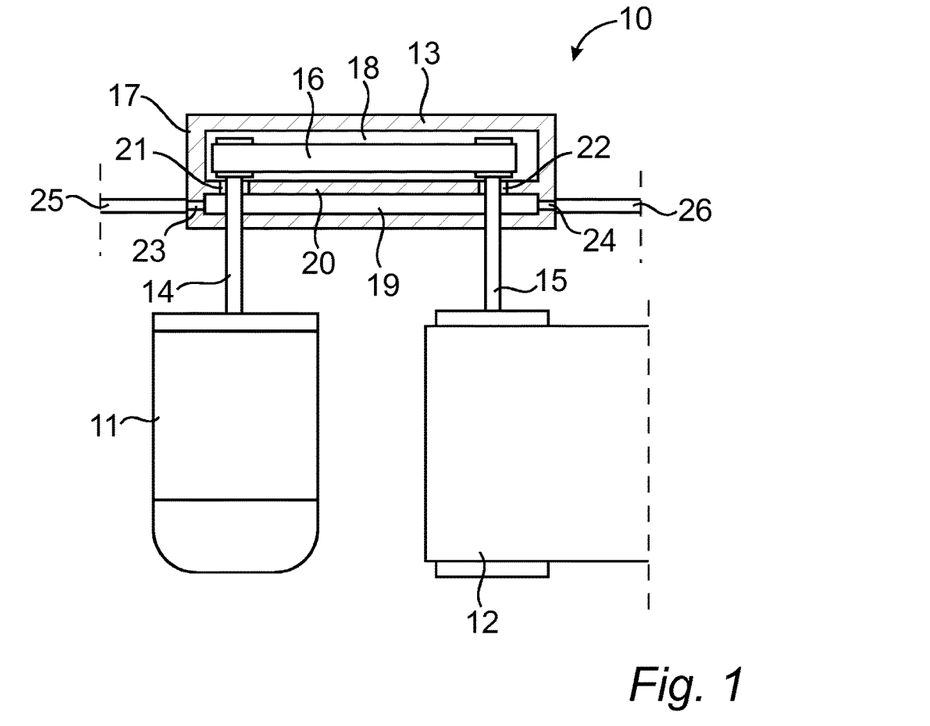
FIG. 1 is a schematic and partial section view of a machine including a device for transferring rotational power from a first shaft to a second shaft according to one embodiment.
Figure 2:
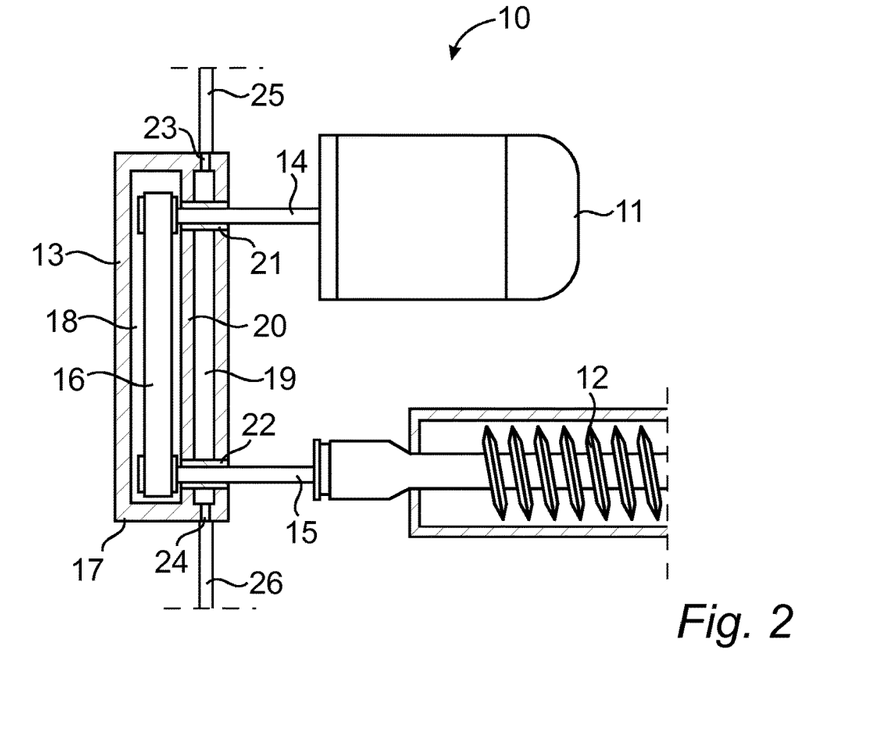
FIG. 2 is a schematic and partial section view of a machine including the device for transferring rotational power according to another embodiment.

With reference to FIGS. 1 and 2 a part of a machine 10, including a motor 11, a rotating component 12 and a device 13 for transferring rotational power, also called torque, from the motor 11 to the rotating component 12 is illustrated according to different embodiments of the invention. For example, the machine 10 is an industrial machine used for producing or handling goods, such as mixing, milling, drilling, conveying or similar operations which requires movement, such as rotational movement or rotational movement converted into linear movement. For example, the machine 10 is a stationary machine, which is fixed at a site of operation, wherein the machine 10 optionally is movable between sites of operation, e.g. by means of conventional transportation, such as by truck, boat, plane or manual transportation. For example, the machine 10 is provided with wheels (not illustrated) for short range transportation and positioning of the machine 10 at the desired location of operation, e.g. within an industrial facility or building. Alternatively, the machine 10 is a non-stationary machine and hence movable, wherein the machine is provided with wheels for movement of the machine during operation. For example, the machine 10 is arranged to operate inside an industrial building. For example, the machine 10 is arranged to operate in a goods manufacturing or handling industry, such as the food industry, pharmaceutical industry, cosmetics industry, plastics industry, etc. With reference to FIG. 1 the machine 10 is a band conveyor for transporting goods. In FIG. 2 the machine 10 is an extruder, e.g. for extruding foodstuff for further processing or for extruding a pharmaceutical compound or for extruding a plastic material.

The device 13 is arranged for transferring rotational power from a first shaft 14 to a second shaft 15. The device 13 comprises an endless toothed belt 16 connected to the first shaft 14 and the second shaft 15 for transferring the torque from the first shaft 14 to the second shaft 15. The first shaft 14 is connected to or is part of the motor 11. In the illustrated embodiment the motor 11 comprises the first shaft 14 for output power in the form of rotational power. For example, the motor 11 is an electric motor, such as a conventional electric motor for industrial purposes. The motor 11 and the device 13 for transferring rotational power can be adapted to the power requirement of the desired application. The device 13 can handle a variety of output powers from the motor 11 and can be arranged smaller or bigger as desired. The second shaft 15 is connected to or is part of the rotating component 12. Alternatively, the first and second shafts 14, 15 are included in the device 13 for transferring rotational power.

The device 13 connects the first shaft 14 with the second shaft 15 for transferring the output power from the first shaft 14 to the second shaft 15. For example, the device 13 extends substantially perpendicular to the first shaft 14 and is arranged for transferring rotational power in a direction substantially perpendicular to the first shaft 14. Hence, the belt 16 runs in a direction perpendicular to or substantially perpendicular to the first shaft 14. For example, the device 13 is arranged substantially perpendicular to the second shaft 15 for transferring rotational power in a direction substantially perpendicular to the second shaft 15. For example, the first shaft 14 is arranged substantially in parallel to the second shaft 15. For example the second shaft 15 is displaced in a radial direction in relation to the first shaft 14, wherein the shafts 14, 15 are spaced apart. For example, the second shaft 15 is arranged below the first shaft 14. In the illustrated embodiment, the first shaft 14 and the second shaft 15 extend from a first side of the device 13. For example, one end of the first shaft 14 and one end of the second shaft 15 are connected to the device 13. For example, the first shaft 14 projects from the motor 11 or the remaining parts thereof.

In FIGS. 1 and 2 the device 13 is illustrated schematically in a simplified manner according to one embodiment. The device 13 comprises the belt 16 as described above. The device 13 further comprises a housing 17 having a first cavity 18 and a second cavity 19 separated from the first cavity 18 by a wall 20. The belt 16 is arranged in the first cavity 18. The first cavity 18 is provided with a first liquid, such as oil, wherein the belt 16 is partially immersed in said first liquid. For example, the first liquid is provided in the bottom part of the first cavity 18. For example, the second shaft 15 is arranged below the first shaft 14 as illustrated in FIG. 2, wherein the second shaft is arranged in a bottom area of the first cavity 18. The second cavity 19 is provided with a second liquid in the form of a cooling liquid, such as water, coolant or a mixture thereof. The second liquid is provided for cooling the wall 20 and thereby cooling the first liquid and the belt 16 arranged in the first cavity 18. Hence, the belt 16 rotates in the first cavity 18, wherein the first liquid lubricates and cools the belt 16.

The device 13 is arranged with bearings, such as a first bearing or a first bearing set 21, and a second bearing or a second bearing set 22. The first and second bearing sets 21, 22 comprise, for example two bearings, and extend through the wall 20 between the first cavity 18 and the second cavity 19. For example, the first and second bearing sets 21, 22 also extend through a part of the housing 17, wherein the second cavity 19 is formed around the first and second bearing sets 21, 22, respectively. The cooling liquid inside the second cavity 19 is provided for cooling said first and second bearings 21, 22. The first and second bearings 21, 22 are provided with a liquid proof sealing to prevent leakage of the first liquid from the first cavity 18 and for sealing the first cavity 18.

The device 13 comprises an inlet 23 to the second cavity 19, and an outlet 24 from the second cavity 19 for the second liquid, wherein the second liquid can be circulated through the second cavity 19. It is understood that the inlet can be used as an outlet and that the outlet can be used as an inlet as they are formed by through holes in the housing 17. In the illustrated embodiment the inlet and outlet 23, 24 are arranged at opposite ends of the device 13 so as to introduce the second liquid at one end and leading the second liquid out from the opposite second end. For example, the inlet 23 is arranged at a top part of the device 13, wherein the outlet 24 is arranged at a bottom part of the device 13 as illustrated in FIG. 2. The inlet and outlet 23, 24 are connected to a source of the second liquid (not illustrated) through first and second tubes 25, 26, respectively. For example, a pump (not illustrated) is arranged for circulating the second liquid from a cooling liquid source, to the second cavity 19 through the first tube 25 connected to the inlet 23, through the second cavity 19, out through the second tube 26 connected to the outlet 24 and back to the cooling liquid source. The cooling liquid source is, e.g. a tank comprising the second liquid, such as water or a cooling liquid comprising a coolant such as glycol or similar.

For example, the housing 17 comprises a structure 27 having a base wall and side walls being connected to the wall 20 to form the second cavity 19. Alternatively, the side walls of the structure 27 are fastened to the wall 20 to form the second cavity 19. For example, the base wall is arranged substantially in parallel to the wall 20. For example, the hollow structure 27 forms a bracket for mounting to a supporting structure (not illustrated).

Figure 3:
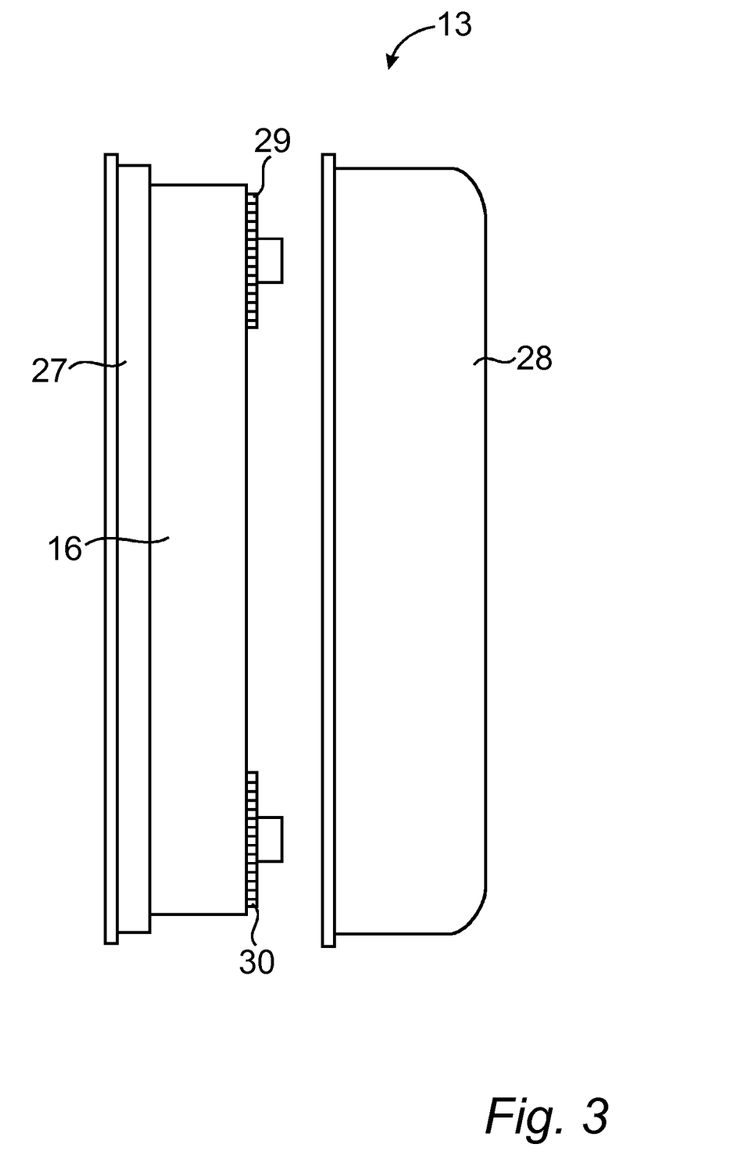
FIG. 3 is a schematic side view of the device according to one embodiment, wherein a lid of a housing of the device has been opened to illustrate parts therein.

With reference to FIG. 3, the device 13 comprises the structure 27 and a lid 28. Optionally, the lid 28 is removable. The lid 28 and the wall 20 form the first cavity 18. For example, the lid 28 is connected to the hollow structure 27, directly or through the wall 20. In the illustrated embodiment the first shaft 14 extends through the hollow structure 27 and through the wall 20 and into the first cavity 18 for transferring rotational power to the belt 16 arranged inside the first cavity 18. For example, the first shaft 14 extends through an upper part of the wall 20 and into an upper part of the first cavity 18. The second cavity 19 is formed around a part of the first shaft 14. Similarly, the second cavity 19 is formed around a part of the second shaft 15, wherein the second shaft 15 extends from the first cavity 18 and through the wall 20. For example, the second shaft 15 extends through the hollow structure 27 and into the first cavity 18. For example, the second shaft 15 extends through a lower part of the wall 20 and into a lower part of the first cavity 18. Hence, the second cavity 19 is, e.g. arranged between the first cavity 18 and a part of the motor 11 from which the first shaft 14 projects. According to one embodiment the device 13 is a self-contained unit. For example, the device 13 is detachable and removable from the first shaft 14 and the second shaft 15.

According to the illustrated embodiment the device 13 comprises a first pulley 29 and a second pulley 30 for interaction with the belt 16, wherein the belt 16 engages the first and second pulleys 29, 30. The first and second pulleys 29, 30 are arranged inside the first cavity 18. One of said first and second pulleys 29, 30 is connected to the first shaft 14, wherein the other of said first and second pulleys 29, 30 is connected to the second shaft 15. The first and second pulleys 29, 30 are, e.g. toothed pulleys for engaging the belt 16, wherein the pulley 29, 28 connected to the first shaft 14 drives the belt 16 and wherein the belt 16 drives the pulley 29, 28 connected to the second shaft 15.

Figure 4:
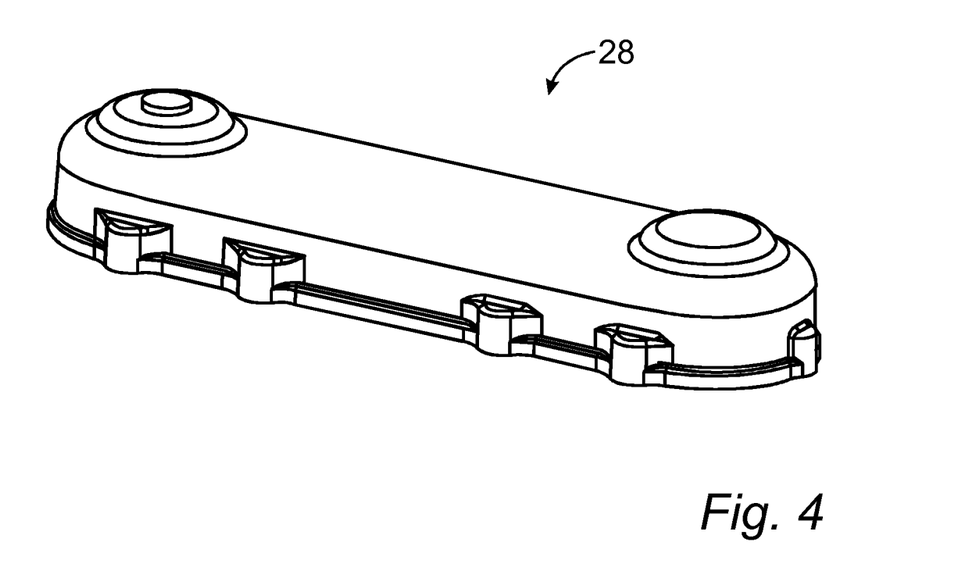
FIG. 4 is a schematic perspective view of the lid of the device according to one embodiment.
Figure 5:
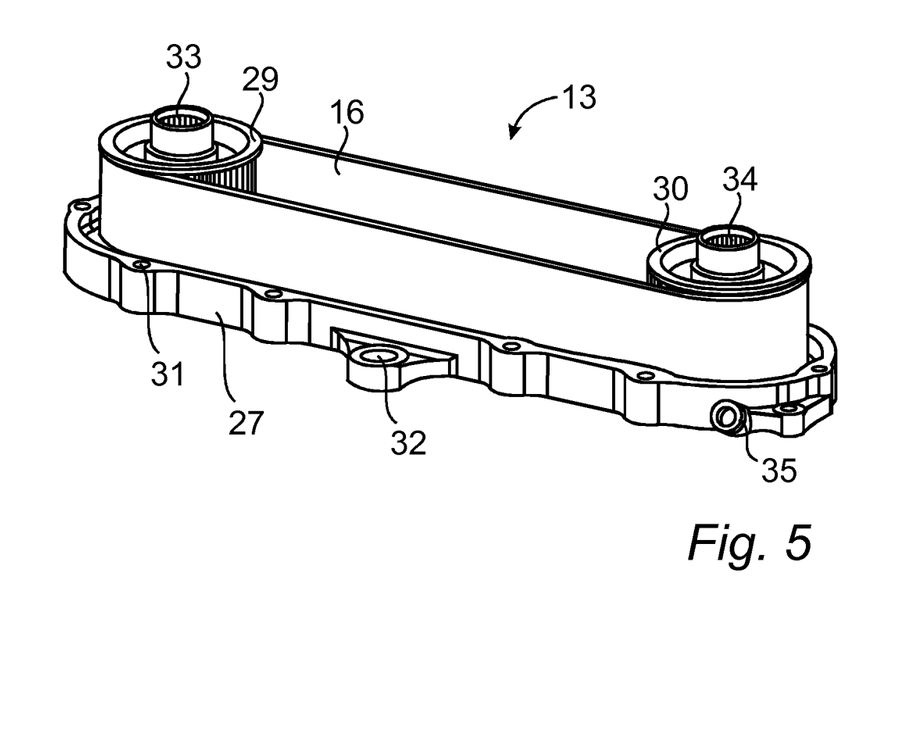
FIG. 5 is a schematic perspective view of the device without the lid according to one embodiment.
Figure 6:
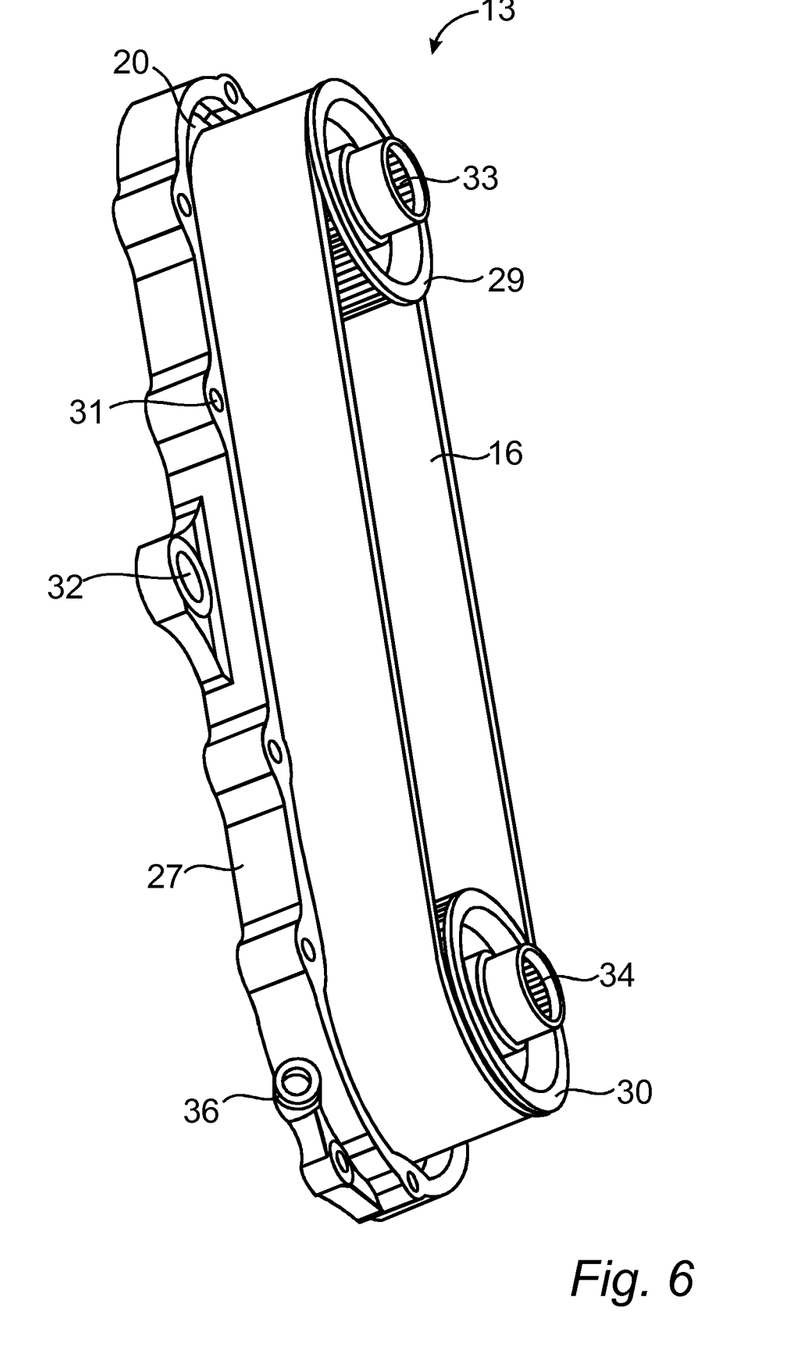
FIG. 6 is a schematic perspective view of the device without the lid according to FIG. 5.

In FIG. 4 the lid 28 is illustrated according to one embodiment, wherein the device 13 without the lid 28 is illustrated in FIGS. 5 and 6. As illustrated in FIGS. 4-6 the structure 27 is formed with holes 31 and the lid 28 is formed with corresponding holes distributed around the periphery of the lid 28 and structure 27 for receiving fasteners, such as conventional screws or similar, for fastening the lid 28 to the structure 27. In FIGS. 5 and 6 the structure 27 is also provided with through apertures 32 for fastening to a supporting structure.

As illustrated in FIGS. 5 and 6, the pulleys 29, 30 are provided with interior splines 33, 34. For example, the first shaft 14 and the second shaft 15 are arranged with similar splines for engaging said splines 33, 34 of the first and second pulleys 29, 30, wherein the device 13 can be easily mounted on the first and second shafts 14, 15 and also pulled off the first shaft 14 and the second shaft 15 if required.

Figure 7:
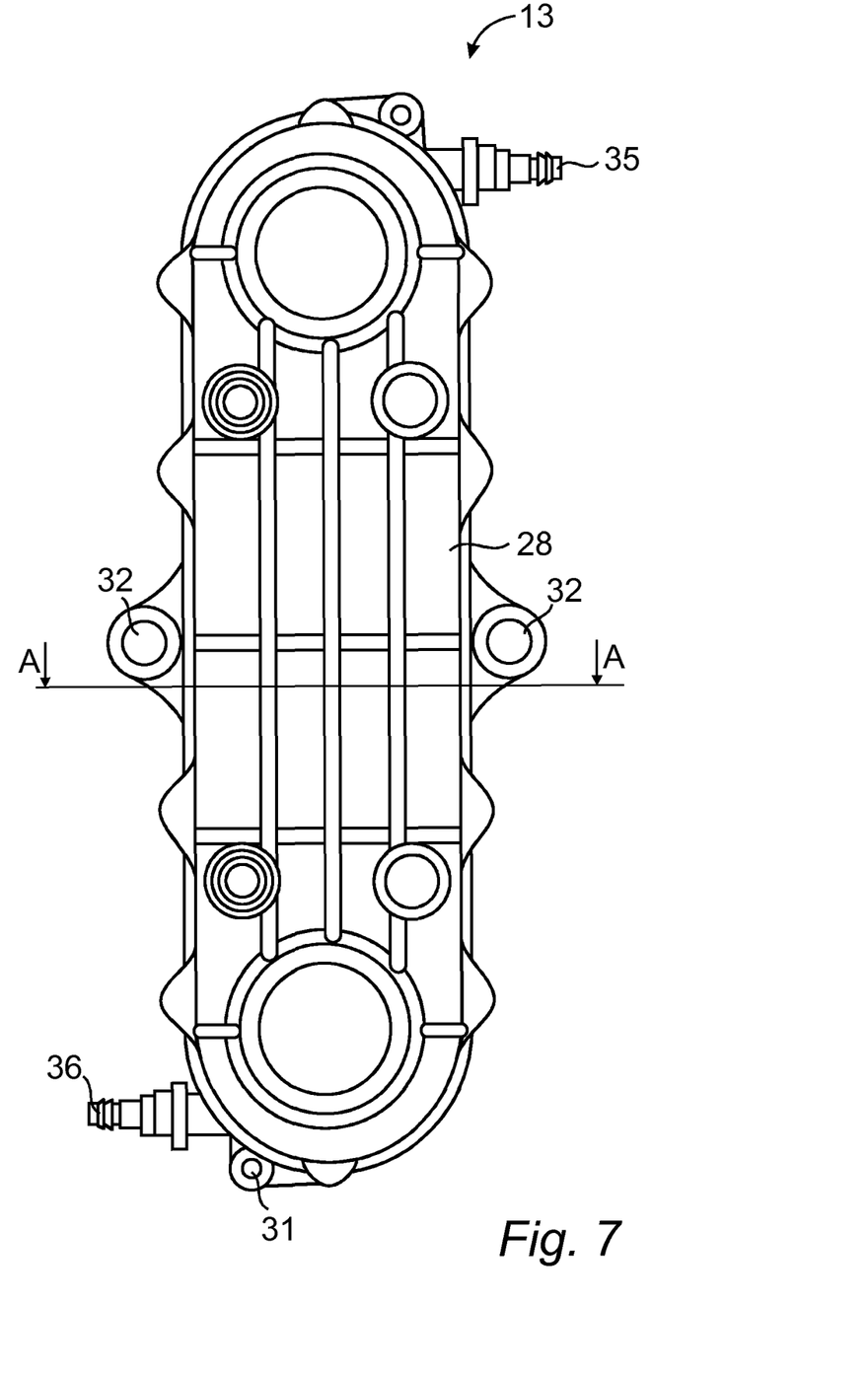
FIG. 7 is a schematic view of the device according to one embodiment.
Figure 8:
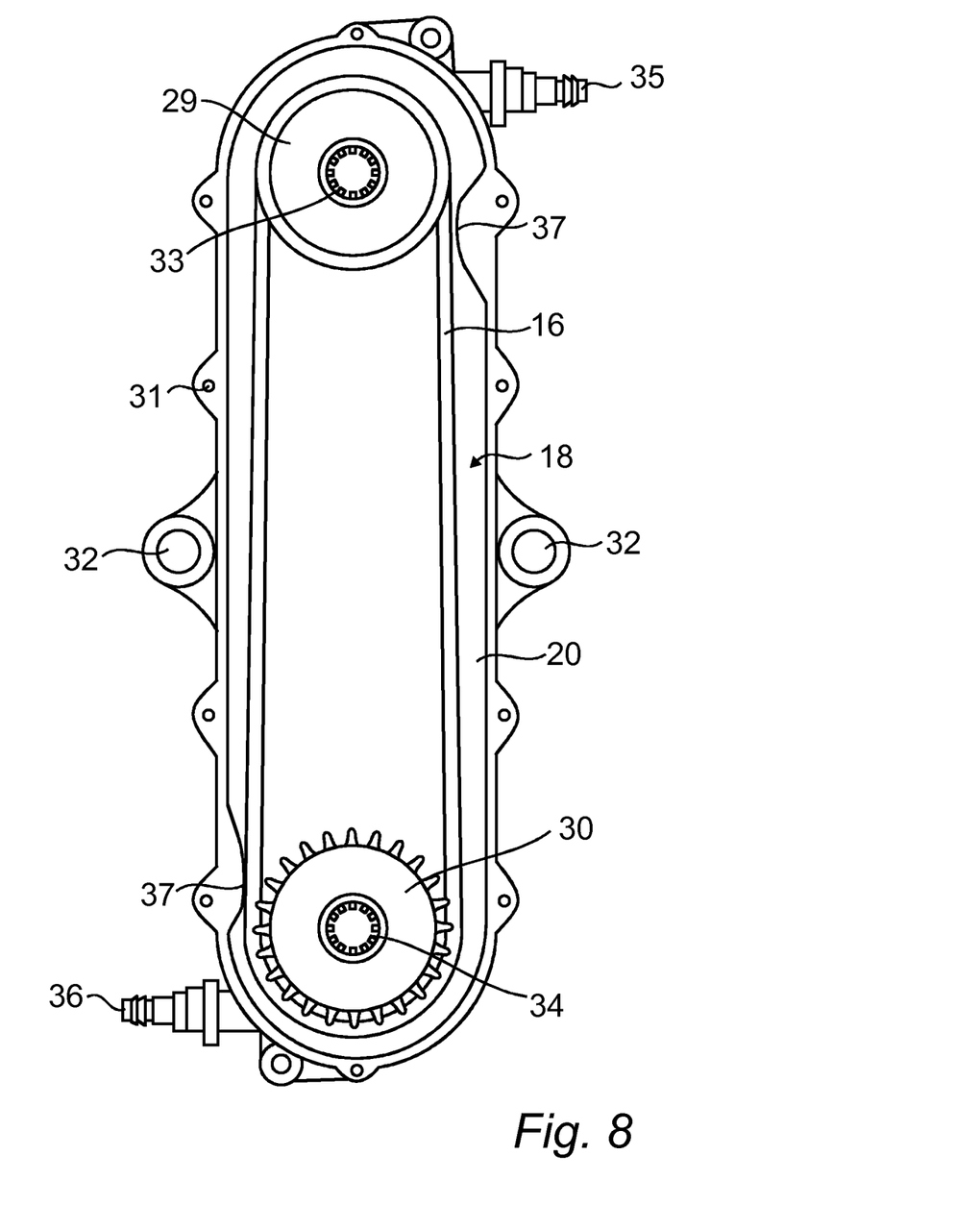
FIG. 8 is a schematic view of the device without the lid, illustrating a first cavity thereof.
Figure 9:
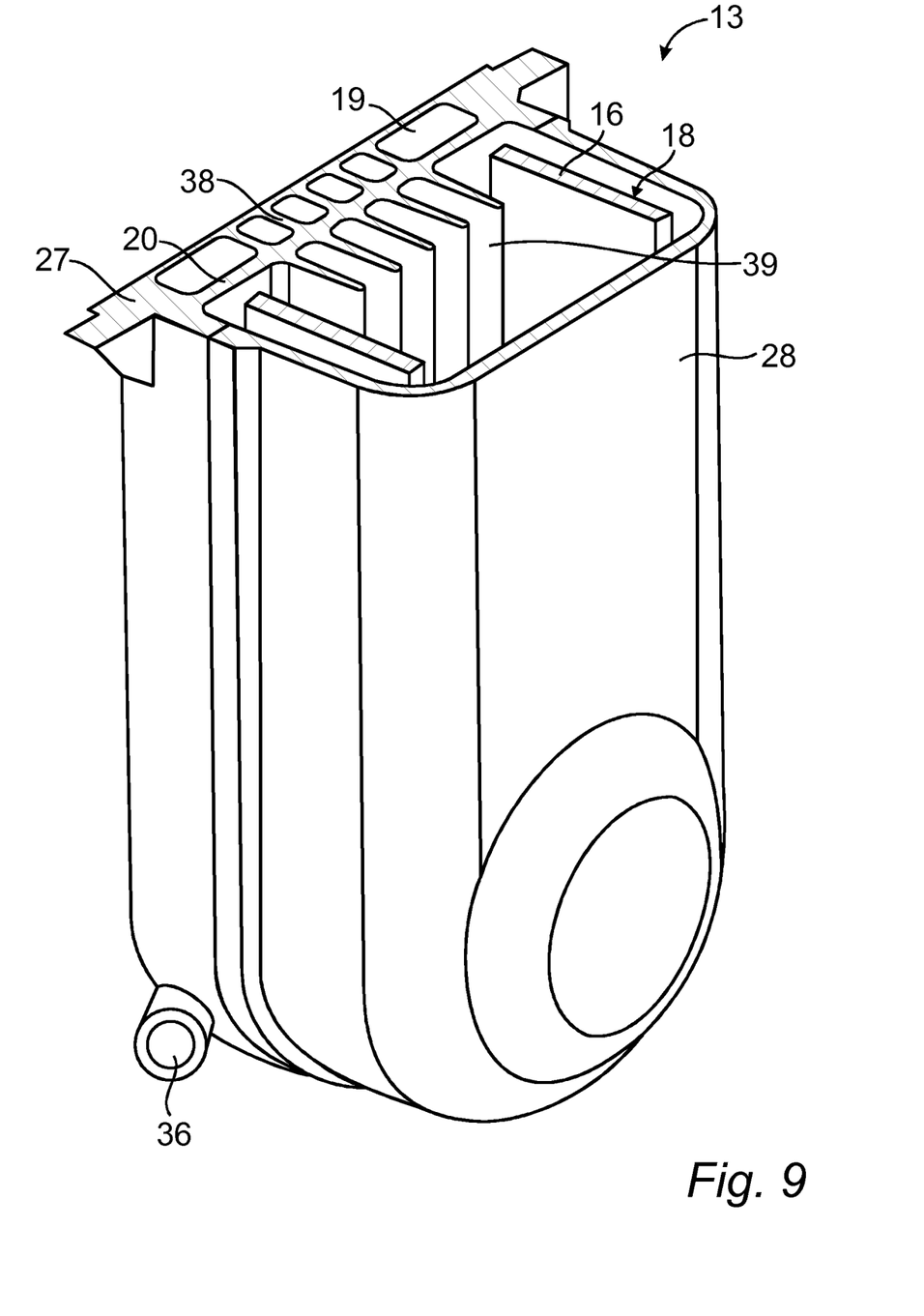
FIG. 9 is a schematic perspective cross section view of the device according to one embodiment.
Figure 10:
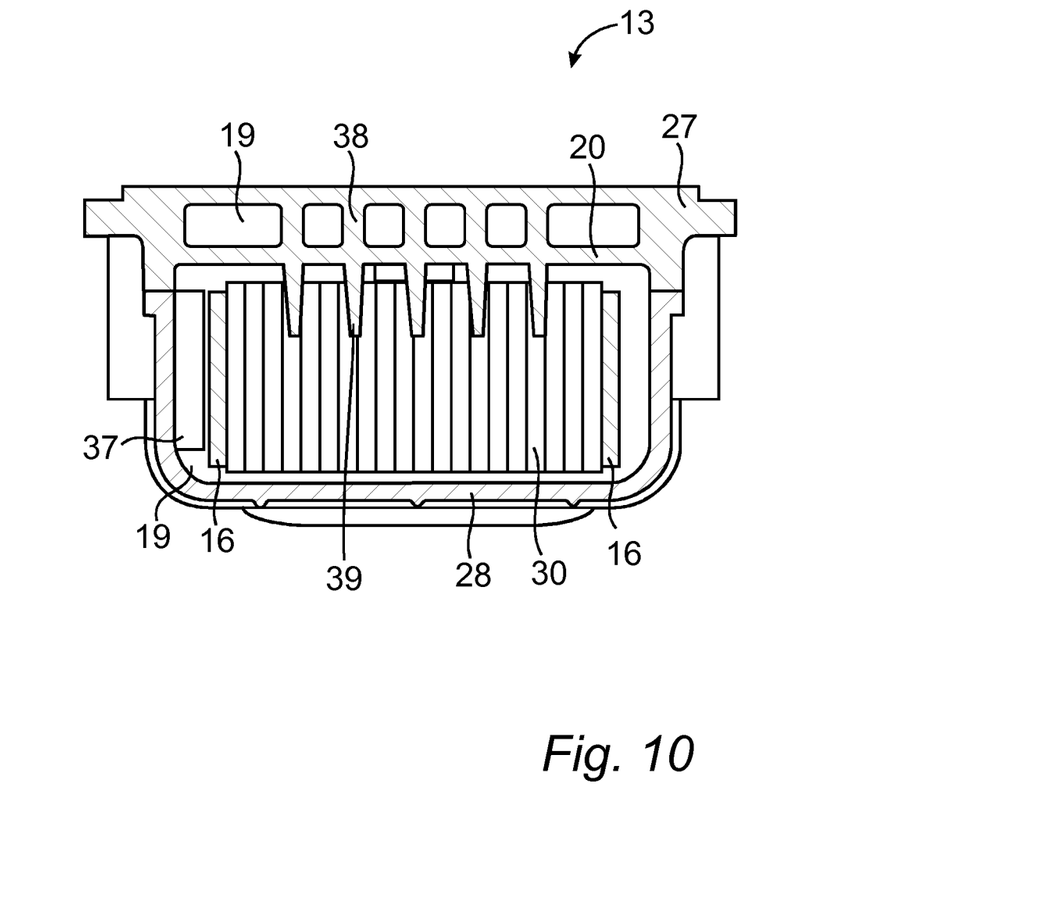
FIG. 10 is a schematic section view of the device of FIG. 9.

In FIG. 7 the lid 28 covering the hollow structure 27 is illustrated according to one embodiment. In FIG. 8 the interior of the first cavity 18 is illustrated without the first liquid. For example, in FIG. 8 the lid 28 has been removed to illustrate the belt 16 and the interior of the first cavity 18 according to one embodiment. FIGS. 9 and 10 are schematic and simplified cross section views along the line A-A in FIG. 7.

With reference primarily to FIGS. 7 and 8 the device 13 comprises a first coupling 35 to the inlet 23 to the second cavity 19, and a second coupling 36 to the outlet 36 from the second cavity 19 for the second liquid, wherein the second liquid can be circulated through the second cavity 19. In the illustrated embodiment the first and second couplings 35, 36 are arranged at opposite ends of the device 13 so as to introduce the second liquid at one end and leading the second liquid out from the opposite second end. The first and second couplings 35, 36 are, e.g. arranged as couplings for the first and second tubes 25, 26, so that the tubes 25, 26 can be connected to the inlet and outlet 23, 24 to the second cavity 19 of the housing 17. In the illustrated embodiment the first and second couplings 35, 36 are arranged symmetrically on opposite ends and on opposite sides of the device 13, wherein the device 13 is formed with a rotational symmetry. For example, the couplings 35, 36 are conventional fast-type couplings with flanges, wherein the tubes 25, 26 can be pushed onto the couplings 35, 36 for connection to the housing 17.

In the illustrated embodiment the through apertures 32 for fastening the device 13 or other types of fastening means are arranged on opposite sides of the device 13, such as on opposite sides of the hollow structure 27, wherein the fastening means 43 are arranged symmetrically so that the device 13 is formed with a rotational symmetry. For example, the device 13 is mounted with flexible fastening means, such as rubber bushings, to lower the stress in the first shaft 14 and the second shaft 15, which stress can be caused by small misalignments due to tolerance errors in manufacturing or assembly of the different parts of the device 13 or the machine 10. In an embodiment wherein the device 13 is self-contained with the bearings 29, 30 mounted into the housing 17, there will be no resulting radial forces from the belt 16 acting on the first shaft 14 and the second shaft 15 or fastening means, only momentum will be transferred. Therefore there can be a flexible fastening means mounted between a rubber mounted motor 11 or gearbox 27 and the device 13. The flexible fastening means cannot handle radial forces but can withstand small radial movement and high rotational vibrations from the motor 11 without transferring these to the second shaft 15.

With reference to FIG. 8, the lid 28 has been removed from the device 13 to illustrate the first cavity 18 more in detail. For example, the first cavity 18 is elongated having first and second ends, wherein the first and second pulleys 29, 30 are arranged substantially at the ends of the housing 17, i.e. with a small gap to the inner surface of the housing 17 to accommodate the belt 16. For example, the belt 16 is arranged to run with a small gap to the inner surface of the housing 17.

In the embodiment of FIG. 8 at least one belt guide 37 is arranged in the first cavity 18 for guiding the belt 16 and preventing the belt 16 from disengaging the first and second pulleys 29, 30. For example, there are two belt guides 37. According to the illustrated embodiment the belt guides 37 are protrusions extending from the internal periphery of the housing 17 and into the first cavity 18. For example, the belt guides 37 are fixed inside the housing 17, such as machined protrusions of the housing 17 forming belt guiding surfaces. In the illustrated embodiment, a first belt guide 37 is arranged at the first pulley 29, wherein an optional second belt guide 37 is arranged at the second pulley 30. The belt guide 37 or one of the belt guides 37 is arranged at the slack side of the belt 16 to engage an outer side of the belt 16 if required. The other of the belt guides 37, if applicable, is arranged on the opposite side of the housing 17 to be arranged at a slack side if the device 13 is rotated 180 degrees. For example, the belt guides 37 are arranged so that they do not normally engage the belt 16, i.e. with a small gap between the belt guides 37 and the belt 16 when the belt 16 is fully engaged with the pulleys 29, 30. The gap is adapted to the teeth of the belt 16 and pulleys 29, 30, wherein the belt 16 engages the belt guide 37 before disengaging the pulley 29, 28. Hence, the belt guide 37 and the belt 16 are arranged so that the belt 16 is prevented from climbing on the teeth of the pulleys 29, 30. For example, the first liquid is provided for lubricating the belt 16 and reducing any friction between the belt 16 and the belt guides 37. For example, the device 13 does not have a tensioner pulley. For example, the first and second pulleys 29, 30 are arranged with a fixed center to center distance in relation to each other. According to one embodiment the bearings 21, 22 are conical bearings, wherein the belt 16 is provided with tension when the pulleys 29, 30 with the bearings 21, 22 are pushed into position on the first shaft 14 and the second shaft 15 and the bearings 21, 22 supporting the pulleys 29, 30 thereby are aligned into the desired center to center distance. Alternatively, the pulleys 29, 30 are pushed onto the bearings 21, 22 being arranged on the shafts 14, 15, wherein the pulleys 29, 30 are aligned into the desired center to center distance by the bearings 21, 22 being conical bearings.

According to one embodiment the first and second pulleys 29, 30 are arranged with different sizes, wherein the size of the first pulley 29 is different from the size of the second pulley 30. For example, the first pulley 29 is smaller than the second pulley 30. For example, the first pulley 29 has a smaller number of teeth than the second pulley 30. The device 13 is arranged with an imaginary axis of rotation in the centre between the first and second pulleys 29, 30, i.e. in the centre between the first shaft 14 and the second shaft 15. Said axis of rotation extends in parallel to the first shaft 14 and the second shaft 15, wherein the device 13 is detachable and rotatable around said axis of rotation. Hence, the device is removable from the remaining parts of the machine 10, rotatable 180 degrees and then connectable to the remaining parts of the machine 10 so as to change position of the pulleys 29, 30 connected to the first shaft 14 and the second shaft 15 respectively. Hence, the first and second pulleys 29, 30 are optionally connectable to the first shaft 14 and the second shaft 15 to change the gear ratio of the power transmission. Hence, the device 13 is arranged as a distinct unit, which is removable and detachably connectable to the first shaft 14 and second shaft 15, wherein the device 13 is easy changeable. For example, by turning the device 13 180 degrees and thereby changing the positions of the first and second pulleys 29, 30 the gear ratio is changeable as low as 1, 16. For example, the belt 16 and the bearings 21, 22 are arranged in the first cavity 18 that is sealed from the surrounding environment. For example, the first cavity 18 is sealed from the surrounding environment by only two radial seals.

With reference to FIGS. 9 and 10 the belt housing 17 is provided with fins 38 in the second cavity 19 to increase the surface of the belt housing 17 that is exposed to the second liquid, such as water, and thereby increase the heat transfer. For example, the hollow structure 27 is formed with the fins 38. For example, the fins 38 extend across the second cavity 19 dividing the second cavity 19 into channels for the second liquid. Alternatively, the fins 38 extend from the wall 20 dividing the first and second cavities 18, 19. In the illustrated embodiment the belt housing 17 is provided with flanges 39 in the first cavity 18 to increase the surface of the belt housing 17 exposed to the first liquid, such as the oil, and thereby increase heat transfer from the first liquid to the belt housing 17. The flanges 39 extending in the first cavity 18 also act as separator of the first liquid to lower the turbulence energy in the first liquid resulting in lowering the friction and heat generated by turbulence. The flanges 39 extend from the wall 20 and into the first cavity 18 between the pulleys 29, 30. Hence, the fins 38 and the flanges 39 extend from opposite sides of the wall 20. For example, the flanges 39 extend substantially in parallel to legs of the belt 16. For example, the flanges 39 extend into the first cavity 18 between the legs of the belt 16, so that an inner side of the belt legs face the flanges 39. For example, the flanges 39 extend into the first cavity 18 in an area radially enclosed by the belt 16, so that the belt 16 encloses the flanges 38 or at least a part of the flanges 38, such as free ends thereof. For example, the flanges 39 extend into the first cavity 18 at least ¼ of the distance across the first cavity 18, or at least ½ the distance across the first cavity 18. Alternatively, the flanges 39 extend across the entire first cavity 18 or substantially across the entire first cavity 18. In the illustrated embodiment the first cavity 18 is arranged substantially in parallel to the second cavity 19 and on only one side of the first cavity 18. Alternatively, the second cavity 19 is arranged on at least two sides of the first cavity 18. Alternatively, the second cavity 19 encloses the first cavity 18 or a part of the first cavity 18. Alternatively, the device 13 comprises two or more cavities for cooling liquid, such as front and back second cavities 19, wherein one such second cavity, e.g. is arranged on the lid 28. For example, the second cavity 19 extends along the entire first cavity 18, wherein the wall 20 extends along the entire length of the first and second cavities 18, 19. For example, the second cavity 19 is arranged substantially in parallel to the first cavity 18 and extends along at least a substantial part of the first cavity 18 and the wall 20, such as at least along half the distance between the first and second shafts 14, 15. For example, the wall 20 without any fins 38 and/or flanges 31 is flat and extends in a single plane.

Figure 11:
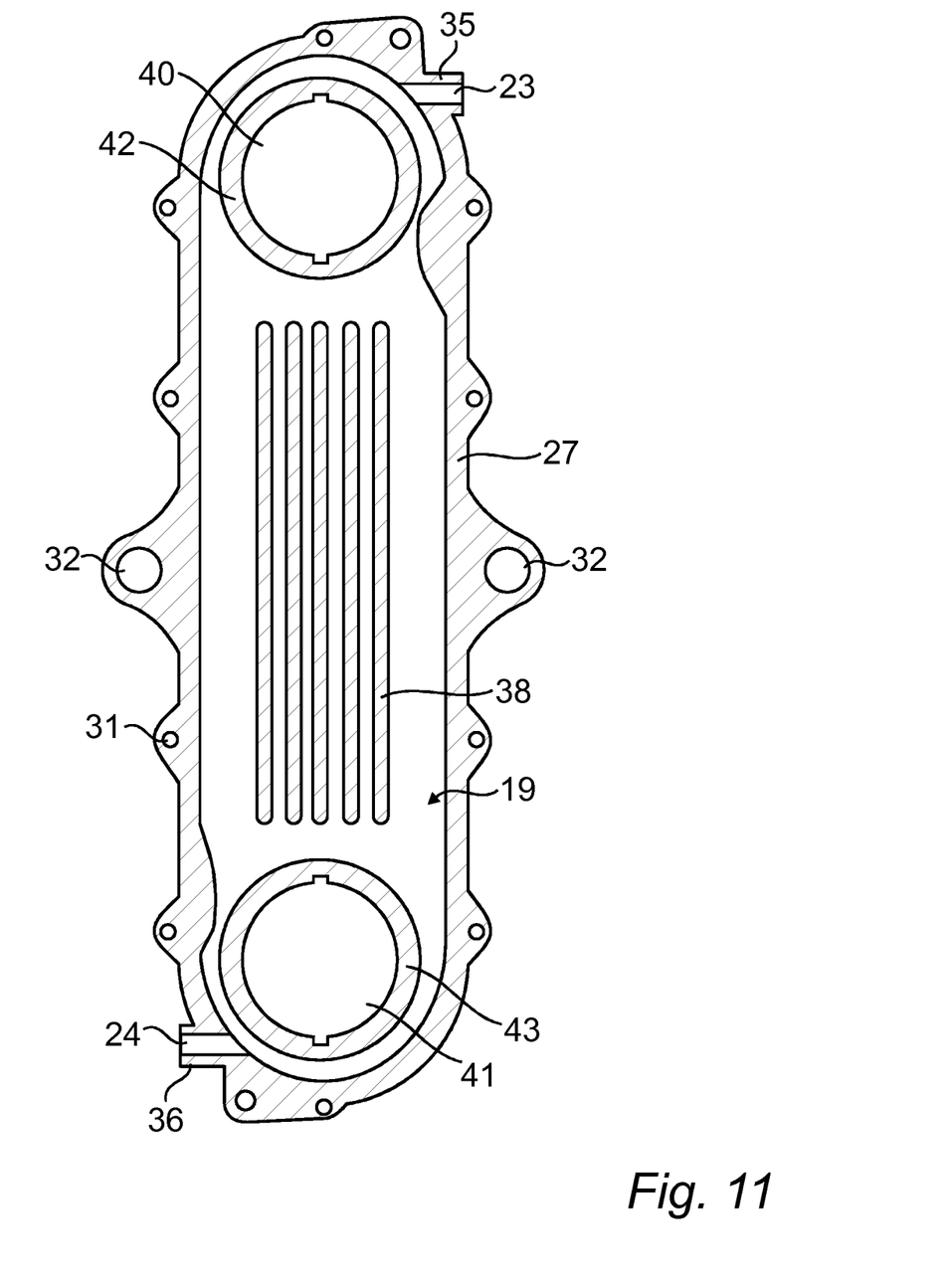
FIG. 11 is a schematic section view of the device, illustrating the second cavity according to one embodiment.

With reference to FIG. 11 a part of the housing 17 is illustrated schematically, wherein the second cavity 19 is visible. For example, FIG. 11 illustrates a part of the hollow structure 27, wherein the wall 20 has been removed. The hollow structure 27 is arranged with the first and second couplings 35, 36 for connecting the tubes 25, 26 to the inlet 23 and the outlet 24 of the housing 17 to provide the flow of the second liquid through the second cavity 19. The hollow structure 27 is provided with the fins 38 as described above.

The hollow structure 27 is formed with a first through aperture 40 and a second through aperture 41 for the first shaft 14 and the second shaft 15. For example, the first and second apertures 40, 41 are arranged for receiving the bearings 21, 22. The second cavity 19 is formed around the first and second apertures 40, 41, wherein the first and second apertures 40, 41 are separated from the second cavity 19 by means of interior walls 42, 43 of the housing 17. Hence, the second liquid circulating in the second cavity 19 flows around the first and second apertures 40, 41 and cools the first shaft 14 and the second shaft 15 or the first and second bearings 21, 22 connecting the first shaft 14 and the second shaft 15 to the pulleys 29, 30 arranged in the first cavity 18. For example, the centers of the first and second apertures 40, 41 are arranged at the same distances from a center of the device 13, so that the device 13 is arranged with a rotational symmetry as described above. Alternatively, the second cavity 19 is formed around at least one of the first and second apertures 40, 41.

The invention claimed is:

1. A device for transferring rotational power from a first shaft to a second shaft, comprising an endless toothed belt and a housing, wherein the belt is arranged inside said housing and is connectable to the first and second shafts for transferring rotational power from the first shaft to the second shaft, wherein the housing comprises a first cavity and a second cavity separated from the first cavity by means of a wall, and wherein the belt is arranged in the first cavity, wherein the first cavity is provided with a first liquid for contacting the belt, the second cavity is provided with a second liquid, wherein the second liquid is a cooling liquid, and
the housing comprises an inlet to the second cavity and an outlet from the second cavity for the second liquid, and wherein the second cavity is connected to a source of the second liquid through the inlet, so that the second liquid can be circulated through the second cavity.

2. The device according to claim 1, wherein the first liquid is oil for cooling and lubricating the belt.

3. The device according to claim 1, wherein a first bearing for receiving the first shaft and a second bearing for receiving the second shaft are provided in holes in said wall, and wherein the bearings are arranged with liquid proof sealing for sealing the first cavity.

4. The device according to claim 1, wherein the housing comprises a first aperture for the first shaft and a second aperture for the second shaft, and wherein at least one of the first and second apertures extend through the second cavity and into the first cavity and are separated from the second cavity by means of walls.

5. The device according to claim 1, wherein the housing comprises a hollow structure and a lid, wherein the second cavity is arranged inside the hollow structure, and wherein the first cavity is formed by the lid being engaged to the hollow structure.

6. The device according to claim 1, wherein a first pulley and a second pulley are arranged inside the housing, the belt being connected to the first and second pulleys.

7. The device according to claim 6, wherein a distance between a centre of the first pulley and a centre of the second pulley is fixed when the device is assembled.

8. The device according to claim 6, wherein the pulleys are arranged on conical bearings.

9. The device according to claim 1, wherein the housing is provided with at least one belt guide arranged in the first cavity on a slack side of the belt.

10. The device according to claim 1, wherein the housing comprises cooling flanges extending from the wall and into the first cavity between first and second legs of the belt.

11. The device according to claim 1, wherein the housing is provided with fins extending from the wall and into the second cavity.

12. The device according to claim 1, wherein the first shaft is connected to or is part of an electric motor.

13. A machine, comprising an electric motor, a moving part and the device for transferring rotational power according to claim 1 for transferring the rotational power from the electric motor to the moving part.

14. A method for transferring power in a stationary machine or a machine having wheels by means of the device according to claim 1.

* * * * *